United States Patent [19]
Horie

[11] 3,984,743
[45] Oct. 5, 1976

[54] REGENERATIVE BRAKING CONTROLLER FOR D.C. MOTOR

[75] Inventor: Taturo Horie, Katsuta, Japan

[73] Assignee: Hitachi, Ltd., Japan

[22] Filed: June 28, 1974

[21] Appl. No.: 484,322

[30] Foreign Application Priority Data
July 2, 1973 Japan.............................. 48-74542

[52] U.S. Cl................................. 318/375; 318/379
[51] Int. Cl.² ........................................... H02P 5/06
[58] Field of Search ............ 318/376, 377, 378, 375, 318/379, 380, 381

[56] References Cited
UNITED STATES PATENTS

| | | | |
|---|---|---|---|
| 2,818,542 | 12/1957 | Linsley et al. | 318/377 |
| 3,293,525 | 11/1966 | Haupt | 318/381 X |
| 3,633,084 | 1/1972 | Rakes | 318/377 |
| 3,866,098 | 2/1975 | Weiser | 318/381 |

*Primary Examiner*—B. Dobeck
*Attorney, Agent, or Firm*—Craig & Antonelli

[57] ABSTRACT

Regenerative braking controller for controlling a direct current motor adapted to drive a railway tramcar, an electric automobile or the like, comprises a direct current power supply, a series circuit composed of the armature and the field coil of the motor and a smoothing reactor, a chopper circuit connected in parallel with the series circuit and a diode inserted between the parallel circuit and the direct current power supply. The apparatus is characterized by an excitation circuit for exciting the field of coil of the d.c. motor with the voltage of the d.c. power supply so that a current may flow to the d.c. source due to voltage generated by the d.c. motor, and for supplying a power necessary for the operation of the chopper circuit from the d.c. source at the time of a low regenerating voltage of the d.c. motor.

14 Claims, 12 Drawing Figures

REGENERATIVE BRAKING CONTROLLER FOR D.C. MOTOR

The present invention relates to controlling apparatus for regeneratively braking a direct current (d.c.) motor especially adapted to drive a railway tramcar or the like.

Figure 1:
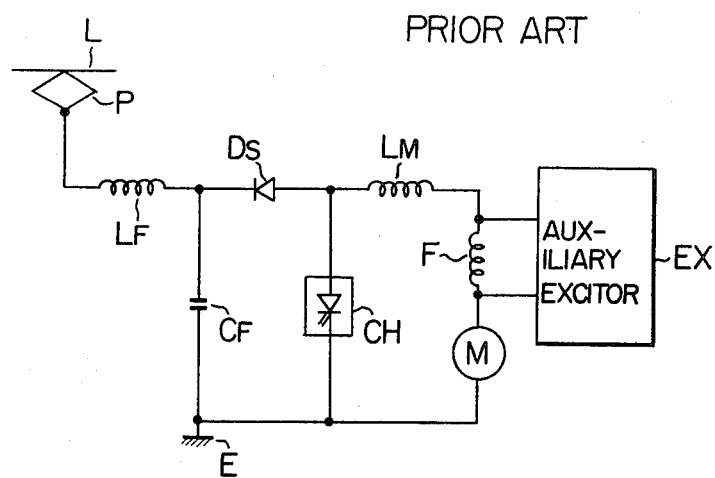
Figure 2:
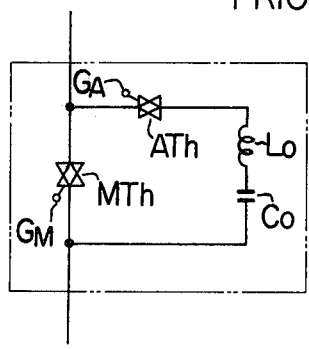
Figure 3:
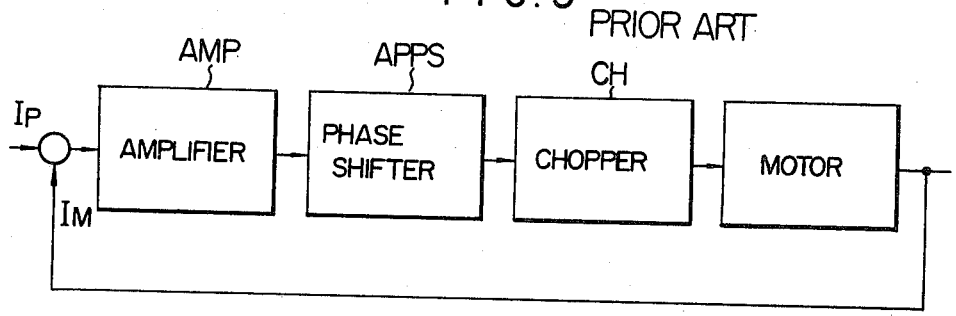
Figure 4:
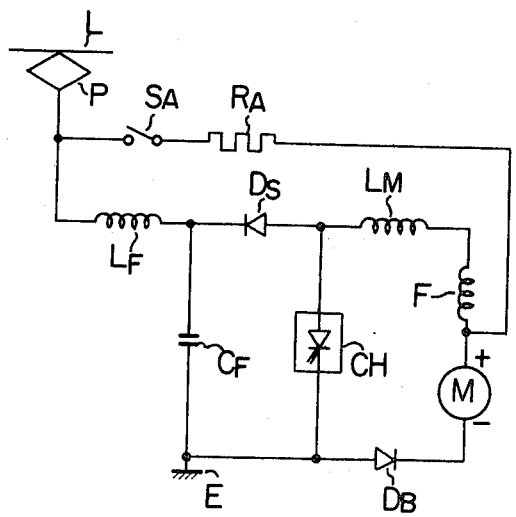
Figure 8:
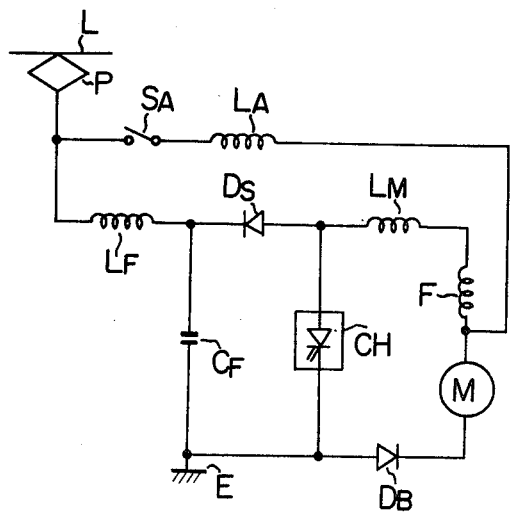
Figure 9:
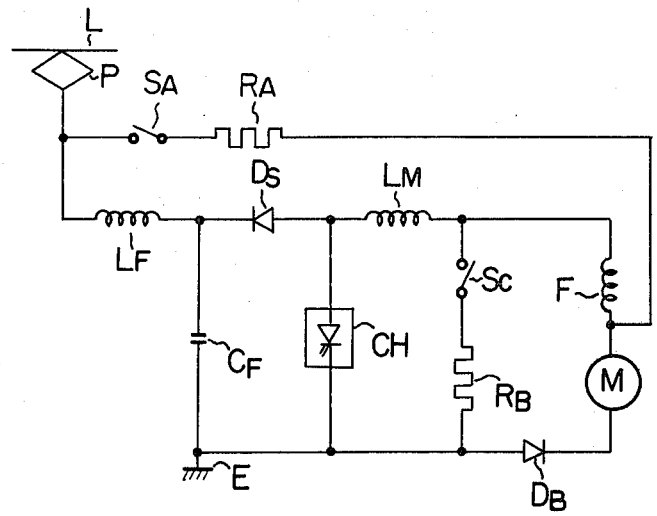
Figure 10:
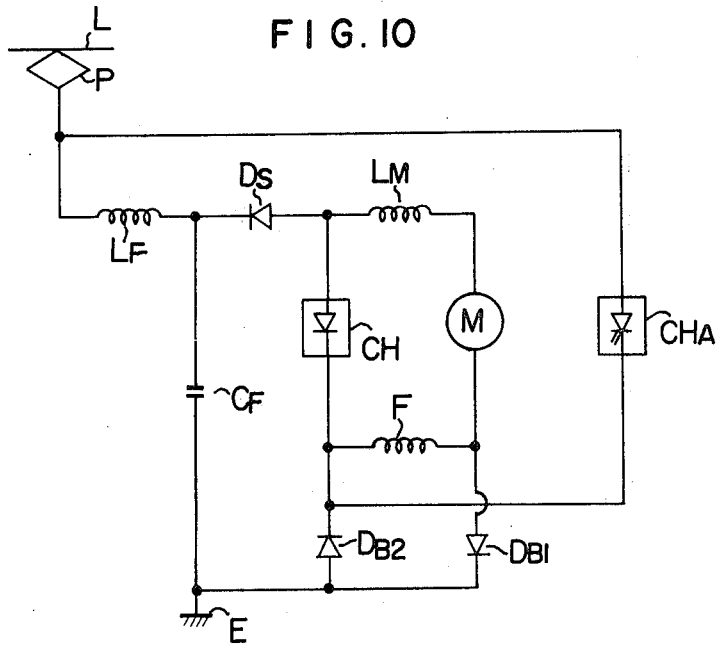
Figure 11:
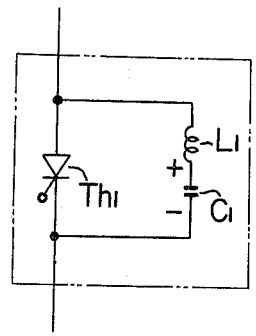
Figure 12:
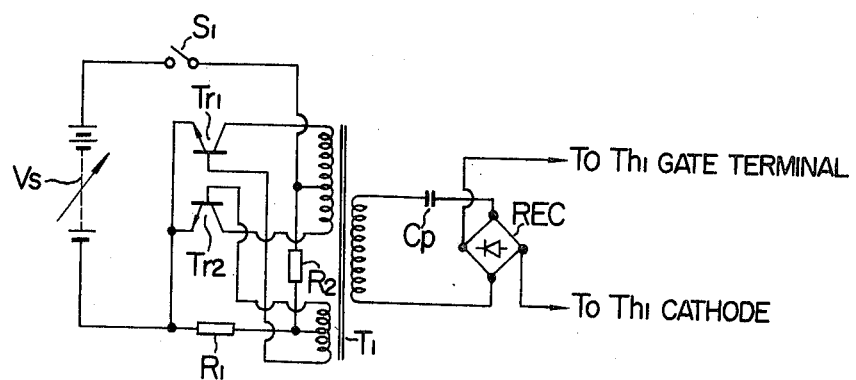

The prior art and the present invention and advantages of the invention will be described in detail with reference to the annexed drawings, in which FIG. 1 is a circuit diagram of a conventional apparatus for controlling the regenerative braking operations of a d.c. traction motor for a tramcar by means of a thyristor chopper circuit, FIG. 2 is a circuit diagram of a chopping circuit with thyristor used in the apparatus shown in FIG. 1, FIG. 3 is a basic block diagram for explaining a regenerative braking operation, FIG. 4 is a circuit diagram schematically showing the main portion of an apparatus according to an embodiment of the invention, FIGS. 5 to 9 are circuit diagrams of apparatus according to other various embodiments of the present invention, FIG. 10 is a schematic circuit diagram showing an apparatus according to still another embodiment of the invention, FIG. 11 is a circuit diagram showing an example of a chopping circuit with thyristor for use in the embodiment shown in FIG. 10, and FIG. 12 is a circuit diagram showing a gate control device for the chopping circuit with thryistor shown in FIG. 11.

For driving the railway tramcars, a series d.c. motor is usually employed in consideration of the fact that the torque characteristics thereof are suited for driving such tramcars. The torque and rotational speed of the d.c. motor are controlled by a resistor and a contact apparatus which is operated to disconnectably insert the resistors in the motor circuit.

The above-mentioned control system of resistance type has, however, drawbacks that a continuous control can not be accomplished and that the use of a resistor give rise to a relatively greate power loss.

Lately in an effort to eliminate such drawbacks, apparatus for controlling the d.c. motor by means of a chopping circuit with thyristor (hereinafter called as a thyristor chopper or merely a chopper) have been developed and are used for practical applications at present. The control apparatus for the d.c. motor employing the thyristor chopper allows a continuous control throughout the whole range to be controlled. Therefore, man can enjoy good riding quality in the electrically driven car provided with such controller. Additionally, a power loss can be reduced. Particularly in case of the railway tramcar, the controller of this type is used not only for controlling the power running but also the regenerative braking operations of the tramcar in order to more effectively reduce the total power consumption.

FIG. 1 shows a typical example of the main circuit of a conventional apparatus for controlling the regenerative braking of a d.c. motor by using a thyristor chopper as mentioned above.

In FIG. 1, reference character L denotes an overhead feeder line for an electric tramcar having a pantograph collector P. The reference letter M indicates the armature of a d.c. motor provided with a series field coil F which is connected in series with the armature M and a smoothing reactor $L_M$. A thyristor chopper CH is connected in parallel with the series connection or circuit composed of the armature M, the field coil F and the reator $L_M$ and connected to a diode $D_s$ which serves to block a backward flow of current from the tramcar feeder line L to the ground E when the chopper CH is turned on. A filter circuit composed of a reactor $L_F$ and a capacitor $C_F$ is provided to minimize a current pulsation of the tramcar line voltage and current which may occur due to the ON-OFF operation of the chopper CH. Letter EX represents an auxiliary exciting device.

As can be seen from FIG. 2 which shows a typical example of a practical circuit arrangement of the copper, the chopper CH comprises a thyristor MTh for chopping a traction current (hereinafter called as a main thyristor) a commutating thyristor ATh, a commutating reactor $L_o$ and a commutating capacitor $C_o$. The main thyristor MTh and the commutating thyristor ATh are of reverse conductive types having respective diodes incorporated therein. Reference letters $G_M$ and $G_A$ indicate gate terminals of the thyristors MTh and Ath, respectively.

In operation, the main thyristor MTh and hence the chopper CH are turned on in response to a gate signal applied to the gate terminal $G_M$. While the main thyristor MTh is in the on state, another gate signal is applied to the gate terminal $G_A$ of the commutating thyristor ATh which is thus switched on, whereby a commutating current flows through the closed circuit starting from $C_o$ through $L_o$, ATh and MTh back to $C_o$. Subsequently, the main and the commutating thyristors MTh and ATh are both successively turned off due to the reverse commutating current.

If the conducting time interval of the chopper is represented by $T_1$ and the period of the control operation by T, the current conducting ratio $\alpha$ of the chopper CH is given by $T_1/T$.

When the regenerative braking operation is to be carried out by the circuit shown in FIG. 1, a command current value $I_P$ and the actual motor current $I_M$ are compared with each other in a comparator amplifier AMP, as is shown in a control block diagram of FIG. 3, which amplifier than produces an output signal representative of difference between the values $I_P$ and $I_M$. The output signal from the comparator AMP is applied to a phase shifter APPS as a control input thereto. The current conducting ratio $\alpha$ of the chopper CH is in turn controlled by an output signal from the phase shifter APPS.

When a gate signal is applied to the gate terminal $G_M$ of the main thyristor MTh to turn the chopper CH on, the series connection of the motor armature M, the field coil F and the smoothing reactor $L_M$ is short-circuited, and a closed loop circuit is established extending from M through F, $L_M$ and CH back to M. The motor current $I_M$ is therefore progressively increased at a rate determined by the time constant of the closed loop circuit and the electric characteristics of the motor, while energy is stored in the smoothing reactor $L_M$.

Thereafter, a gate signal is applied to the gate terminal GA of the commutating thyristor ATh at an appropriate time point to thereby switch the thyristor into the conducting state, whereupon a commutating current is produced to turn the chopper CH off, as aforementioned.

When the chopper CH has thus been switched into the non-conducting state, the motor current $I_M$ mainly caused by energy discharged from the smoothing reactor $L_M$ flows through the closed loop from M through elements F, $L_M$, $D_S$, $L_F$, P, L and E back to M. This means that the motor current flows to the tramcar feeder line L as a regenerative current at the time when the chopper CH is turned off. In this manner, when the chopper CH is in the non-conducting state, the motor current is regeneratively reduced at a rate determined by the relation existing among the time constant of the closed circuit, the voltage generated by the traction motor and the feeder line voltage.

The regenerative braking control process is performed by repeating the on-off operations of the chopper CH while controlling the current conducting ratio $\alpha$. Such braking control operation may be continued substantially just before the tramcar is stopped by increasing the current conducting ratio $\alpha$ of the chopper CH in accordance with the reduction in the motor speed and thus the voltage generated by the motor.

The heretofore employed regenerative braking control of the direct current motor using the thyristor chopper as above described is, however, subjected to the following problems or disadvantages to be solved or eliminated.

In the regenerative braking process, the traction motor functions as a series generator. At the time when the motor circuit is switched from the power running mode into the regerative braking operation mode, the voltage generated by the traction motor is due to only the residual magnetic flux at that time and usually lies at a very low level. To deal with such situation, the auxiliary exciting device Ex is generally provided to separately excite the field coil F to a predetermined excitation level, whereby a voltage may be generated in the motor or the armature thereof, which corresponds to the speed of the traction motor at the initiation of the regenerative braking operation.

On the other hand, the auxiliary exciting device practically used at present in the art is of such a type as rectify an alternating current (a.c.) output of a car borne motor-alternator.

The voltage generated by the traction motor can of course be heightened by increasing the excitation by the auxiliary exciting device $E_x$. However, a restriction is inevitably imposed on the available capacity of the motor-alternator in view of the fact that the motor-alternator has to be mounted on the tramcar and from the economical standpoint. Accordingly, the voltage generated by the traction motor by actuating the chopper CH with the aid of the auxiliary excitation will be at a level too low to generate a current enough to instantly produce a predtermined braking force. For example, let us assume that the feeder line voltage is 600 volts or 1500 volts and two or four motors are connected in series to each other, then, in the case of a certain kind of motor, the sum of the voltages generated by the individual motors is less than 100 volts at the motor speed of 100 km/h. Then, considering the case where the motor speed at the initiation of the regenerative braking operation is 30 km/h, for example, the voltage generated by the motors with the aid of the auxiliary excitation may amount to about 30 volts. In this connection, it is conceivable to vary the degree of the auxiliary excitation in dependence upon the motor speed. However, such arrangement requires a detection of the motor speed and an adjustment necessary for the auxiliary exciting device EX and therefore is not preferred from the economical aspect.

As is apparent from the foregoing description, the auxiliary exciting device EX adapted to rectify the a.c. output of the motor-alternator is subjected to a limitation in respect of the available capacity thereof and can not contribute to the desired increase in the voltage generated by the traction motor, as a result of which the regenerative braking operation may not be effected smoothly.

In more detail, there arises a possiblity that the commutating capacitor $C_o$ of the chopper CH is not sufficiently charged so that failure may occur in the commutation. In order to exclude such possiblity, the commutating capacitor $C_o$ may be charged from an external voltage source. However, an auxiliary charging circuit has to be employed to this end, which incurs a much more complicated circuit arrangement.

Furthermore, the main thyristor MTh for the chopper CH is usually composed of a stack of two thyristor elements connected in series with each other in consideration of the breakdown voltage. This holds true also to the auxiliary thyristor ATh. Owing to such circuit arrangement, the thyristor may not become conductive when the voltage generated by the motor is low, even if the gate signal is applied to the gate electrode. This tendency will become more remarkable particularly when the thyristor is provided with an element operative to suppress the raising of current such as an anode reactor or the like. If the main thyristor MTh is not turned on, it is impossible to cause the braking current or the motor current to rise, whereby a rapid regenerative braking control can never be performed. On the other hand, in the case where thyristor elements rated at 1200 volts are used for the thyristor MTh of 1500 volt application, for example, there may happen the case where one of them becomes into the conducting state while the other remains in the non-conducting state even if they are simultaneously fired, due to an unbalance in the latching current and/or holding current thereof, if the regenerating voltage of the motor is very low. In this condition, if the regenerating voltage is raised up rapidly to more than the thyristor blocking voltage of 1200 volts, the non-conducting thyristor element must be broken down. Moreover, in the case of a parallel connection of the thyristor elements, if one of them is turned on while the other remains non-conductive, which is caused by a difference in the characteristics among the employed thyristor elements, the former is overloaded, which is of course undesirable. Besides, when a train of tramcars is provided merely with a single motor-alternator, a same possible failure of the motor-alternator would make it impossible to give the auxiliary excitation, whereby the regenerative braking control can no more be effected.

An object of the present invention is, in view of the drawbacks of the conventional regenerative breaking controller as elucidated above, to provide a regenerative breaking controller for a d.c. motor which assures a smooth performance of the regenerative braking operation by carrying out the auxiliary excitation of the field coil of the d.c. motor at the initiation of the regenerative braking operation with the voltage derived from a d.c. power supply for driving the d.c. motor.

According to the present invention, there is provided a controlling apparatus for regeneratively braking a direct current motor having an armature and a field coil connected to a direct current power supply, comprising a series circuit composed of the armature and the field coil and a smoothing reactor, a chopper means connected in parallel with the series circuit, a diode inserted between the parallel circuit and said direct current power supply, which further comprises an excitation circuit for exciting said field coil by an auxiliary excitation current flowing therethrough due to the voltage of said direct current power supply for generating a current flowing to said direct current power supply due to a voltage generated by said direct current motor.

The other objects, novel features and advantages of the present invention will become apparent from the following description made with reference to FIGS. 4 to 12.

Now, referring to FIG. 4 which is a circuit diagram of a regenerative braking controller according to an embodiment of the invention, reference character $R_A$ indicates a resistor which is connected in series with a switch $S_A$ to form an exciting circuit, one side of which is connected to a pantograph P and hence to a tramcar feeder line L, while the other side of the exciting circuit is connected to the junction between an armature M and a field coil F. Letter $D_B$ denotes a diode. It should be noted that the same reference symbols as those used in FIG. 1 represent equivalent circuit elements.

When the regenerative braking operation is to be controlled with this circuit arrangement, the switch $S_A$ is closed when switching the motor circuit from the powewr running mode into the regenerative braking mode, as a result of which the feeder line voltage is applied to the series connection of the field coil F, smoothing reactor $L_M$ and chopper CH by way of the exciting circuit comprising the switch $S_A$ and the resistor $R_A$. If the chopper CH is turned on in this state, a current will flow due to the feeder line voltage along the following path;

$$L \rightarrow P \rightarrow S_A \rightarrow R_A \rightarrow F \rightarrow L_M \rightarrow CH \rightarrow E.$$

Namely, an auxiliary excitation current will flow through the field coil F. Since the tramcar feeder line voltage is usually 600 or 1500 volts and additionally the aforementioned current conducting ratio $\alpha$ of the chopper CH is maintained relatively high so for as the voltage generated by the motor remains low, that is, the braking current is relatively small, sufficient flows of the auxiliary excitation current as well as the holding current of thyristors can be obtained by a constant current excitation from a high tension power supply such as the tramcar feeder line. As a result the regenerating voltage of the motor is regulated by the chopper CH to raise the breaking current very steeply. In this case, it goes without saying that the auxiliary excitation current is applied in such a manner that the voltage generated by the motor may cause a current to flow with polarity shown in the drawing, i.e., toward the tramcar feeder line L. The resistor $R_A$ functions as a current limiter to suppress an overcurrent possibly appearing at the time of the chopper CH being turned on. The value of this resistor may be selected in the range of 40 to 50 Ω, in the case where the tramcar feeder line voltage is 1500 volts.

It will be noted that the diode $D_B$ serves to prvents a current from flowing through the path extending from L through P, $S_A$, $R_A$ and M to the ground E, when the switch $S_A$ is closed.

When the voltage generated by the tractor motor has been increased to a predetermined level, the auxiliary excitation is no more required, and the switch $S_A$ is opened. The duration while the switch $S_A$ is held closed is in the order of 1 to 2 seconds. The succeeding control process can be excuted in a similar manner as is in the case of the apparatus shown in FIG. 1.

In the inventive regenerative braking control as above described, an adequate auxiliary excitation is available by the fact that the excitation is made by the use of the tramcar feeder line voltage. Further, the chopper CH can be normally operated without fail because the tramcar feeder line voltage is applied also thereto. These result in a satisfactory regenerative braking control.

Figure 5:
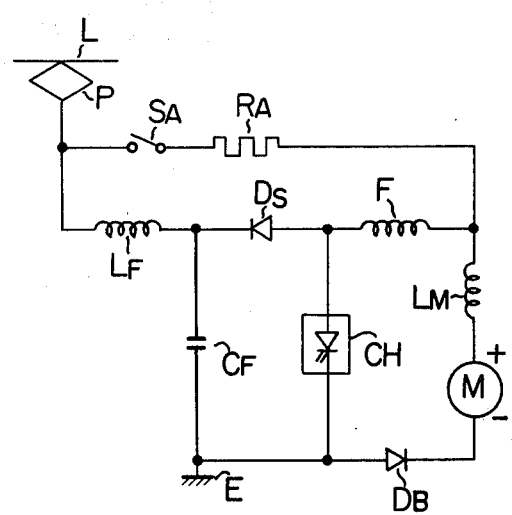

Although the above-mentioned other side of the exciting circuit is connected to the junction between the armature M and the field coil F whereby the exciting current can flow through both the field coil F and the smoothing reactor $L_M$ in the embodiment shown in FIG. 4, it should be appreciated that such connection is due to the specified circuit arrangement of the armature M, field coil F and the smoothing reactor $L_M$ as shown and the exciting current may, alternatively, flow through only the field coil F as is shown in FIG. 5. In general, the resistances of the armature M and the field coil F of the d.c. motor of a class rated at 100 kW used for driving the tramcar are about 10 to 20 mΩ, respectively, and that of the smoothing reactor $L_m$ is in the range of 50 to 100 mΩ. Besides a voltage of the polarity shown in FIG. 5 is produced in the armature M by the residual magnetic flux in the generator operation of the motor with more than 10 times in the field current to the armature current gain. Thus, most of the exciting current will flow through the field coil F when the chopper CH is switched on. Accordingly, in the embodiment of FIG. 5, it is possible to eliminate the diode $D_B$.

Figure 6:
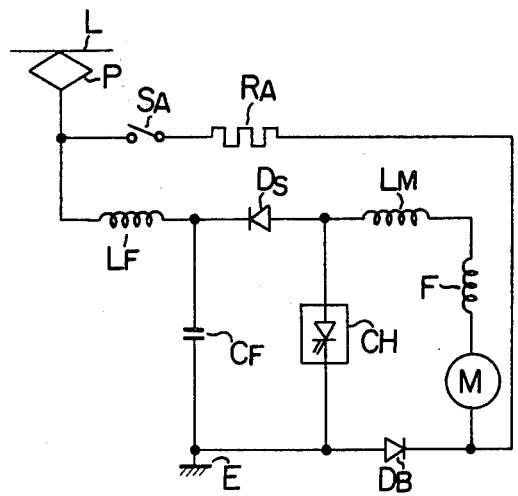

A similar auxiliary excitation may be accomplished in the case where the above-mentioned other side of the exciting circuit is connected to the cathode of the diode $D_B$ as illustrated in FIG. 6.

Figure 7:
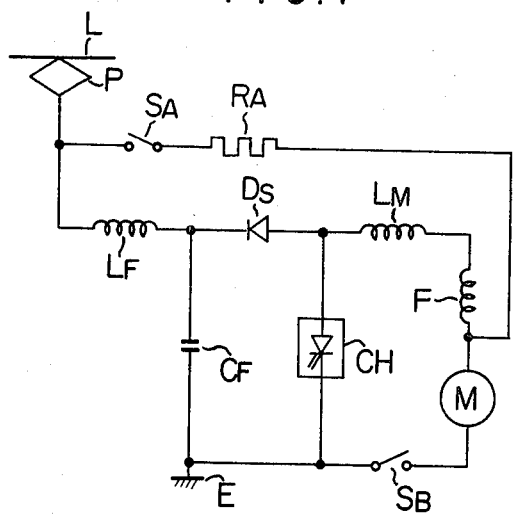

FIG. 7 shows a still further variation in which the diode $D_B$ is replaced by a switch $S_B$. In this embodiment the switch $S_B$ remains open at the initiation of the regenerative braking operation. When the voltage generated by the traction motor has reached a predetermined level, the switch $S_B$ is then closed. In this way, the switch $S_B$ can function equivalently to the diode $D_B$.

In another embodiment shown in FIG. 8, a reactor $L_A$ is substituted for the resistor $R_A$ of the exciting circuit. It will be necessary in this embodiment to use a reactor $L_a$ having an inductance and a resistance considerably greater than those of the smoothing reactor. As can be seen from the embodiment of FIG. 8, the exciting circuit may be composed of an impedance to suppress overcurrent and a switch (SA).

FIG. 9 shows a further embodiment of the invention in which provision is made to cause the auxiliary excitation current to flow through the field coil F, even when the chopper CH is in the off state or in the non-conducting state. More specifically, a series connection of a switch $S_c$ and a resistor $R_B$ is connected in parallel with the chopper CH.

The switch $S_c$ is interlocked with the switch $S_A$ to be simultaneously closed. When the chopper CH is conducting, the auxiliary excitation current for the field coil F will flow through the chopper CH. A little amount of current passes through the resistor $R_B$, because the resistance of the latter is selected greater than that of the smoothing reactor $L_M$. The value of the resistor $R_B$ usually may be about 10 ohms. On the other hand, the resistance of the chopper CH will become infinite when switched off, and therefore the current will flow by way of the resistor $R_B$.

In this manner, the auxiliary excitation current may flow through the field coil F even when the copper CH is in the off state, whereby the voltage generated by the traction motor upon braking operation can be rapidly increased.

Referring to FIG. 10 which shows still another embodiment of the invention wherein provision is made to allow the control of the auxiliary excitation from the tramcar feeder voltage, reference symbols $D_{B1}$ and $D_{B2}$ designate diodes which effect the same function as the aforementioned diode $D_B$. Symbol $CH_A$ represents a chopper adapted to regulate the auxiliary excitation and having a construction schematically shown in FIG. 11.

In FIG. 11, reference letter $Th_1$ denotes a thyristor, $L_1$ is a commutating reactor and $C_1$ is a commutating capacitor. When the thyristor $Th_1$ is in the off state, the capacitor $C_1$ is charged with polarity as indicated in the drawing. When the thyristor $Th_1$ is turned on, a commutating current flows through the closed lope of $C_1$- $L_1$- $Th_1$- $C_1$ and the thyristor $Th_1$ is switched off by the reverse commutating current. The current conducting ratio $\alpha$ of the thyristor $Th_1$ can be controlled by varying the firing period thereof.

To this end, a control circuit such as shown in FIG. 12 may be employed as the gate control means for the thyristor $Th_1$. In FIG. 12, reference symbol $V_s$ indicates a varible voltage source, $S_1$ a switch, $Tr_1$ and $Tr_2$ transistors, $R_1$ and $R_2$ resistors, and $T_1$ a transformer with a saturable iron core. The transistors $Tr_1$, $Tr_2$, the resistors $R_1$, $R_2$ and the transformer $T_1$ constitute in combination a well known Royer oscillator. Reference character $C_p$ denotes a differentiating capacitor, and REC indicates a rectifier brdige circuit.

Upon the switch $S_1$ being closed, the Royer oscillator will produce an oscillation output which is differentiated by the capacitor $C_p$. The thus produced pulses are then rectified by the rectifier circuit REC and applied between the gate and the cathode of the thyristor $Th_1$. The oscillation frequency of the Royer oscillator can be controlled by varying the voltage of the source $V_s$.

When the regenerative braking operation is to be initiated, the switch $S_1$ is closed. The chopper $CH_A$ will control the auxiliary excitation depending on the current conducting ratio $\alpha$ thereof. During the conducting state of the chopper $CH_A$, the auxiliary excitation current for the field coil F will flow through the path extending from L through P, $CH_A$, F and $D_{B1}$ to the ground E. After the voltage generated by the traction motor has reached a predetermined level, the chopper CH should control the regenerative current and the switch $S_1$ is opened, and no gate signal is applied to the thyristor $Th_1$ so that the chopper $CH_A$ is turned off to stop the auxiliary excitation. It should be appreciated that the current conducting ratio $\alpha$ of the chopper $CH_A$ can be controlled by regulating the voltage of the source $V_s$, which consequently allows the regulation of auxiliary excitation current.

As will now be understood from the foregoing description, the present invention provides in summary an improved regenerative braking controlling apparatus for a d.c. motor which uses a thyristor chopper and in which the auxiliary excitation power upon the regenerative braking operation is derived from a d.c. power supply driving the motor to thereby assure an adequate auxiliary excitation and at the same time a desirable stability in the operation of the chopper by applying thereto the voltage of the power supply. The apparatus according to the invention thus allow a smooth performance of the regenerative braking operation. Further, the reliability of operation of the inventive apparatus is significantly enhanced as compared with the hitherto known apparatus effecting the auxiliarily excitation involving a rectification of an a.c. output of a motor-alternator, because the inventive apparatus is no more susceptible to any failure in the motor-alternator which affects adversely the braking operation of the conventional apparatus.

In addition to the above-mentioned advantages of the regenerative breaking controlling apparatus according to the present invention, a further significant advantage can be obtained by the apparatus in the testing of the thyristor chopper CH for its chopping action, because a voltage to be applied to the thyristor chopper for the test can be obtained from a d.c. power supply such as the tramcar feeder line in the above-mentioned embodiments without need to any flow of the armature current, so that there is no fear that the motor undesirably starts its operation and thus a safty requirement is satisfied.

While preferred embodiments of the invention have been described and illustrated, it should be appreciated that they are given merely by way of examples and many modifications and choices in design may be made without departing from the spirit and scope of the invention.

What I claim is:

1. In a controlling apparatus for regeneratively braking a direct current motor having an armature and a field coil connected to a direct current power supply, comprising a series circuit composed of the armature and the field coil and a smoothing reactor, a chopper means connected in parallel with the series circuit, a diode inserted between the parallel circuit and said direct current power supply, the improvement comprising excitation circuit means for supplying said field coil with an auxiliary excitation current from said direct current power supply when regenerative braking is effected, said direct current motor thereby generating regenerative power for producing a current flowing to said direct current power supply.

2. Apparatus as set forth in claim 1, wherein said excitation circuit means comprises a switch and an impedance element connected in series with each other.

3. Apparatus as set forth in claim 1, wherein said excitation circuit comprises a switch and a resistor connected in series with each other.

4. Apparatus as set forth in claim 1, wherein said excitation circuit comprises a switch and a reactor connected in series with each other.

5. Apparatus as set forth in claim 1, further comprising a blocking means inserted in said series circuit to prevent said auxiliary excitation current supplied by said excitation circuit means from flowing to ground instead of flowing to said field coil.

6. Apparatus as set forth in claim 5, wherein said blocking means comprises a diode.

7. Apparatus as set forth in claim 5, wherein said blocking means comprises a switch.

8. Apparatus as set forth in claim 1, wherein said auxiliary excitation current flows to said chopper means through said field coil and said smoothing reactor.

9. Apparatus as set forth in claim 1, wherein said auxiliary excitation current flows to said chopper means only by way of said field coil.

10. Apparatus as set forth in claim 1, further comprising a short-circuiting path composed of a switch and a resistor and connected in parallel with said chopper means.

11. Apparatus as set forth in claim 1, wherein said excitation circuit means comprises a chopper.

12. Apparatus as set forth in claim 11, further comprising a gate control means to control said chopper of said excitation circuit means with a variable frequency.

13. Apparatus as set forth in claim 1, further comprising a gate control means to control the current conducting ratio of said chopper means in accordance with a difference between a current command value and the actual value of the motor current.

14. Apparatus as set forth in claim 1, wherein said auxiliary excitation current flows to said chopper means through said armature, said field coil and said smoothing reactor.

* * * * *